United States Patent [19]

Burgers et al.

[11] Patent Number: 4,608,701

[45] Date of Patent: Aug. 26, 1986

[54] COMMUNICATION RECEIVING UNIT FOR THE SUPPRESSION OF NOISE AND INTERFERENCE SIGNALS

[75] Inventors: Bernhardus W. A. Burgers, Haaksbergen; Adrianus Johannes P. T. Razenberg, Hengelo, both of Netherlands

[73] Assignee: Hollandse Signaalapparaten B.V., GD Hengelo, Netherlands

[21] Appl. No.: 652,367

[22] Filed: Sep. 19, 1984

[30] Foreign Application Priority Data

Sep. 22, 1983 [NL] Netherlands .......................... 8303253

[51] Int. Cl.$^4$ .......................... H04B 15/00; H04K 1/00
[52] U.S. Cl. ........................................ 375/1; 343/368; 343/383
[58] Field of Search .................... 375/1, 96, 99, 102, 375/103, 115, 11, 12, 14; 343/368, 378, 380, 383; 455/296, 303; 328/162, 163, 165, 167; 370/107; 333/18, 28 R; 364/724, 728

[56] References Cited

U.S. PATENT DOCUMENTS

| 3,766,559 | 10/1973 | Butcher, Jr. et al. | 343/368 |
| 4,152,702 | 5/1979 | Piesinger | 343/100 SA |
| 4,156,877 | 5/1979 | Piesinger | 343/100 SA |
| 4,217,586 | 8/1980 | McGuffin | 375/1 |
| 4,255,791 | 3/1981 | Martin | 375/1 |
| 4,298,871 | 11/1981 | Kennedy | 343/100.21 |
| 4,309,769 | 5/1982 | Taylor | 375/1 |
| 4,361,891 | 11/1982 | Lobenstein | 375/1 |
| 4,516,126 | 5/1985 | Masak et al. | 343/384 |

OTHER PUBLICATIONS

R. T. Compton, "An Adaptive Array in Spread-Spectrum Communication System", Proceedings of IEEE, vol. 66, No. 3, Mar. 1978, pp. 298–299, IEEE N.Y.

Primary Examiner—Robert L. Griffin
Assistant Examiner—Stephen Chin
Attorney, Agent, or Firm—Robert J. Kraus

[57] ABSTRACT

A communication receiving unit for the suppression of noise and jamming signals, which receiving unit comprises:

a plurality of antenna elements (1A–1N);

adaptive weighting filters ($7_{A,a}, \ldots, 7_{N,k+1}$) connected thereto;

a combination circuit (4) connected to the weighting filters ($7_{A,a}, \ldots, 7_{N,k+1}$);

a detector (5) connected to the combination circuit (4) suited to generate a replica (d) of the information-supplying carrier signal for demodulating the signal (y) of the combination circuit (4) to the information-related frequency band; and a unit (8) for adjusting the weighting filters ($7_{A,a}, \ldots, 7_{N,k+1}$).

The detector (5) comprises a circuit (40, 41) for determining a time-averaged power value ($W_1$) concerning the signal (y) from the combination circuit (4), and a circuit (42, 43) for determining a time-averaged value ($W_2$) of the cross-correlation concerning the output signal (y) and the replica (d). The adjusting unit (8) is designed for generating modified adjusting signals on the basis of the supplied time-averaged values ($W_1$ and $W_2$) for a more accurate adjustment of the weighting filters ($7_{A,a}, \ldots, 7_{N,k+1}$).

7 Claims, 2 Drawing Figures

COMMUNICATION RECEIVING UNIT FOR THE SUPPRESSION OF NOISE AND INTERFERENCE SIGNALS

BACKGROUND OF THE INVENTION

1. Field of the Invention

The invention generally relates to adapative communication systems and, in particular, to an adaptive communication receiving unit suitable for the suppression of noise and jamming signals; which receiving unit comprises:
- a plurality of antenna elements;
- a network of adaptive weighting filters connected to the antenna elements;
- a combination circuit connected to the networks;
- a detector connected to the combination circuit and provided with means for generating a replica (d) of the information-supplying carrier signal and with means for demodulating the signal (y) of the combination circuit to the information-related frequency band on the basis of the replica (d); and
- adjusting means for generating adjustment signals for the adaptive weighting filters.

The signal produced by the combination circuit consists of three components obtained from the information-carrying communication signal, the jamming signal and the noise.

2. Description of the Prior Art

A receiving unit of the type as set forth in the opening paragraph is known from the article entitled "Adaptive Antenna Systems", by B. Widrow, P. R. Mantey, L. J. Griffiths and B. B. Goode, Proceedings of the IEEE, Vol. 55, 1967, pp. 2143-2159. The communication receiving unit described in this article is designed on a transmission characteristic of the combination of antenna elements, weighting filters and combination circuit, which combination is optimal in respect of the signal distortion; such a receiving unit has an antenna pattern with a relatively low sensitivity in the direction of the jammer and a relatively high sensitivity in the direction of the communication transmission unit. For this reason, an iterative process is performed in the receiving unit, comprising the steps of:
- a signal measurement per weighting filter;
- the calculation of a weighting factor per weighting filter by the adjusting means according to an algorithm adapted to an optimal transmission characteristic;
- the generation of a beam-steering command in the form of adjustment signals by the adjusting means on the basis of the calculated weighting factors for the weighting filters.

With such a communication receiving unit the signals are however measured on a radio-frequency level; this gives rise to problems with respect to the phase synchronisation between the various signals, the broadband performance of the adjusting means, the dynamics of the receiving part subjected to the signal measurement, and the associated hardware complexity of this part.

SUMMARY OF THE INVENTION

It is an object of the present invention to provide a solution to the above problems relating to the signal measurement on a radio frequency level.

According to the invention, the communication receiving unit, as set forth in the opening paragraph, is so designed that the detector comprises first means for determining, for the adjusting means, a value ($W_1$) proportional to the time average of the power concerning the signal (y) produced by the combination circuit and relating to at least a portion of the transmitter frequency band. The detector comprises second means for determining, for the adjusting means, a value ($W_2$) proportional to the time average of the cross correlation concerning the output signal (y) and the replica (d) and relating to at least a portion of the transmitter frequency band. The adjusting means are designed for generating, upon the supply of adjusting signals to the weighting filters, modified adjusting signals on the basis of the time-averaged values ($W_1$ and $W_2$) resulting therefrom to adjust the weighting filters corresponding with an extreme value of a function $f(W_1,W_2)$ containing the two values $W_1$ and $W_2$.

Such a receiving unit stands up well against unknown environmental reflections, even with a large relative bandwidth. In view of any jamming of the communication between two stations, spread-spectrum modulation and demodulation techniques can be applied to advantage, as described in an article of R. C. Dixon, entitled "Spread-Spectrum Systems", Wiley Interscience, N.Y. etc., 1976. With a communication transmitting unit suitable for the application of spread-spectrum modulation on the information-conveying signals, the information about the spread-spectrum modulation used with the generation of the carrier should be available in a communication receiving unit adapted thereto. The means for generating a replica (d) of the carrier of the information-supplying signal received by the receiving unit —hereinafter called replica signal generator—should be provided with memory means for storing the above information about the spread-spectrum modulation required with the generation of the carrier of the signal received by the receiving unit. With coherent spread-spectrum modulation in a communication receiving unit, the carrier and clock frequencies for the spread-spectrum code do differ, but are from one and the same source. In a communication receiving unit adapted thereto the replica-signal generator is able to produce first the complete demodulation signal from the carrier frequency and the spread-spectrum code, whereafter a single demodulation of the signal from the combination circuit takes place. On the other hand, it is possible to carry out a stepped demodulation on the basis of individual signals, viz. a signal at the carrier frequency and a signal with the spread-spectrum code, such as depicted on page 213 of the cited book by R. C. Dixon. In both cases, a single feedback loop, based on phase detection, ensures that the carrier and code-clock frequencies are brought to the appropriate value.

With non-coherent spread-spectrum modulation, i.e. with no fixed relation between the carrier and the clock frequencies, and under non-severe jamming conditions, it is possible to perform the demodulation process as follows: The total demodulation signal is generated with the aid of the output signal of a frequency generator and that of a spread-spectrum code generator. Thereafter, separate feedback loops keep the frequency generator and the spread-spectrum code frequency lined up. However, under severe jamming conditions it is better to perform the demodulation process of the received signal in two steps, that is to line up the spread-spectrum code frequency and the carrier frequency in succession. With such a communication receiving unit the replica generator is provided with a code generator controlled by the memory means and with a frequency generator to be tuned to the carrier frequency, while the demodulation means is provided with a first demodulator for demodulating the signal (y) from the combination circuit by means of the code generator output signal, and with a second demodulator connected to the first demodulator for demodulating the output signal of the first demodulator by means of the frequency generator output signal.

It is possible to start the adaptation of the antenna diagram during the line-up phase of the spread-spectrum code frequency, namely by feeding the output signal of the first demodulator to a correlation detector to produce an output voltage, depending on the measure of correlation between the signals applied to the first demodulator. This output voltage can then be supplied to the adjusting means in substitution for the time-average value ($W_2$).

The invention will now be explained with reference to the accompanying drawing figures.

DESCRIPTION OF THE PREFERRED EMBODIMENT

Figure 1:
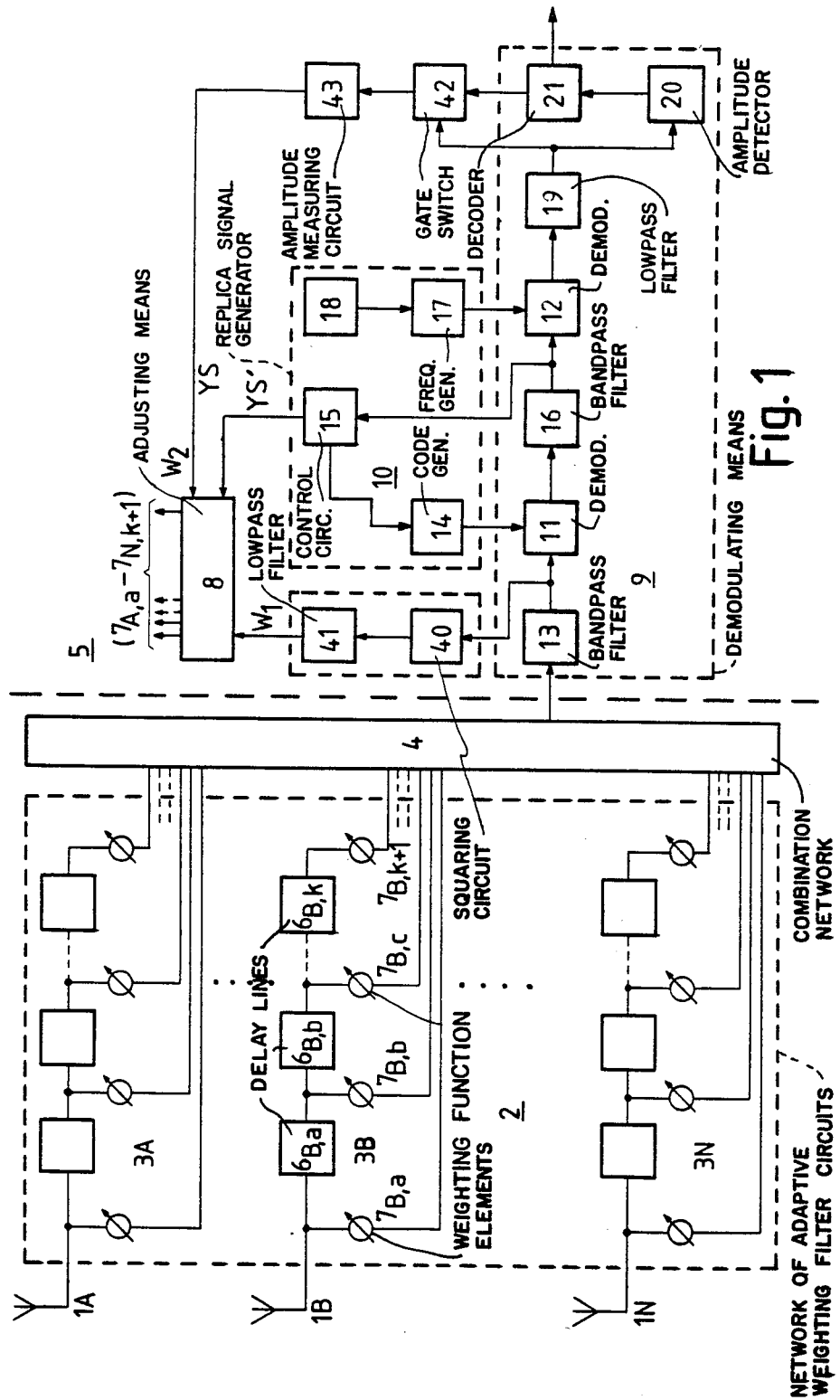
FIG. 1 represents an embodiment of a communication receiving unit.

The communication receiving unit in FIG. 1 consists of a plurality of antenna elements 1A-N, a network 2 of adaptive weighting filter circuits 3A-N, connected to the antenna elements, a combination circuit 4 fed by network 2, and a detector 5 connected to combination circuit 4. Antenna elements 1A-N may be of any type, and must be positioned at small distances from each other, proportionately to the wavelength used, where the geometry need not be considered. The weighting filter circuits 3A-N must be of the wide-band type. In the embodiment in question each weighting filter circuit $3i$, where $i = A, \ldots, N$, consists of a circuit of series-connected delay lines $6_{i,a}$-$6_{i,k}$, while between each two successive delay lines and at both sides of this circuit, tappings with weighting function elements $7_{i,a}$-$7_{i,k+1}$ are incorporated. The output signals of all weighting function elements $7_{i,j}$, where $i = A, \ldots, N$ and $j = a, \ldots, k+1$, are combined in combination circuit 4. Each weighting function element $7_{i,j}$ has a weighting factor $W(m)_{i,j}$, which is set each sample interval m by adjusting means 8.

With the described combination of antenna elements 1A-N, network 2 and adjusting means 8, referred to as an adaptive array in the literature, a communication receiving unit requires a transfer characteristic, which is optimal in respect of the phase distortion of the detected information-carrying signals in view of the dispersiveness of the environment, as well as the signal/interference ratio in the receiving unit.

The signal components present at a certain time t on the tappings to the weighting function elements $7_{A,a}, \ldots, 7_{N,k+1}$ are designated successively by $x(t)_{A,a}, \ldots, x(t)_{N,k+1}$ by which the input signal vector $X(t)^T = [x(t)_{A,a}, \ldots, x(t)_{N,k+1}]^T$ of the weighting function elements is defined by $X(t)^T$, the transpose of vector $X(t)$. By a corresponding notation the available weighting factors $w(m)_{A,a}, \ldots, w(m)_{N,k+1}$ will define the weighting function vector $W(m)$ of network 2 for the weighting function elements $7_{A,a}, \ldots, 7_{N,k+1}$, namely in accordance with the definition $W(m)^T = [w(m)_{A,A}, \ldots, w(m)_{N,k+1}]^T$, where $W(m)^T$ is the transpose of the vector $W(m)$. The output signal $y_t$ of combination circuit 4 can therefore be represented by the relationship $y(t) = X(t)^T \cdot W(m) = W(m)^T \cdot X(t)$.

In the embodiment of the receiving unit in question and in view of any jamming activities which may be expected with a non-predictable dispersiveness of the environment, use is made of the fact that, in adapting the antenna pattern and hence in adjusting the weighting factors, a characteristic in the signal carrier is provided by the transmitting unit, while a priori knowledge about this characteristic is available in the receiving unit. In the embodiment in question, the characteristic in the carrier relates to the type of modulation used, in this case the spread-spectrum type, whereby a greater than normal bandwidth with the communication is used to obtain a more favourable transfer characteristic. Several types of spread-spectrum modulation are known, such as direct-sequence modulation (also called pseudo-noise modulation), frequency-hopping modulation, chirp modulation, time-hopping modulation, as well as various combined types derived therefrom.

In the case of biphase modulation, a transmitter signal $s(t)$ can be represented by $s(t) = p_i(t) \cdot p_s(t) \cdot \sin\omega t$, where $p_i(t)$ is the biphase coded signal comprising the information, $p_s(t)$ the signal produced in accordance with the modulation type, and $\sin\omega t$ the carrier signal. It is customary to keep the modulation frequency of the $p_s(t)$ signal below the carrier frequency, but much higher than the data rate of the $p_i(t)$ signal comprising the information.

The antenna elements 1A-N receive the $s(t)$ transmitter signal jointly with the $n(t)$ noise and $j(t)$ interference signals, resulting in the $y(t)$ signal at the output of combination circuit 4. On the ground of the preset information about the applied type of modulation and the carrier frequency, the $y(t)$ signal is then demodulated. For this purpose the detector 5 is provided with means 9 for demodulating the $y(t)$ signal of combination circuit 4 to the frequency band (i.e. the information band) associated with the information. The demodulation is effected by a signal $d(t) = p_s(t + \phi_1) \cdot \sin(\omega t + \phi_2)$, where $p_s(t + \phi_1)$ and $\sin(\omega t + \phi_2)$ represent replicas of the modulation signals generated in the transmitting unit. It is also possible to carry out the demodulation in steps, for example first a demodulation with the $p_s(t + \phi_1)$ signal and then the resulting $y(t) * p_s(t + \phi_1)$ signal with the $\sin(\omega t + \phi_2)$ signal. Detector 5 comprises a replica signal generator 10 for generating the $d(t)$ demodulation signal or instead thereof the individual $p_s(t + \phi_1)$ and $\sin(\omega t + \phi_2)$ signals. The adaptation of the antenna pattern relative to the location of the receiving unit, and hence the determination of the weighting function vector $W(m)$, is said to be ideal only if the $y(t)$ signal to be supplied approaches the $d(t)$ demodulation signal (or the composite signal of the individual demodulation signals) as well as possible, thus minimising the passage of noise and interference signals. The antenna arrangement should therefore be so adapted that the error signal $\epsilon(l) = d(l) - y(l)$ generated is minimised in absolute value and regarded over a certain time interval k with measuring intervals $l = 1, \ldots, M$, so that $$\sum_{l=1}^{M} \epsilon^2(l)$$

assumes a minimum value. From an ergodic ensemble of individual input signals X(l) and the desired d(l) modulation signal with the same set of weighting factors W(k) it follows that the expected value or the ensemble least mean square error:

$$f_{lmse} = E[\epsilon^2(l)] = E[\{d(l) - W(k) \cdot X(l)\}^2] = E[d^2(l)] + E[y^2(l)] - 2E[d(l) \cdot y(l)].$$

Since the average values of the above terms are determined on the basis of time averaging on sampling values during time interval k, the above relationship can be expressed as:

$$E[\epsilon^2(l)] = G[d^2(t)] + G[y^2(t)] - 2G[d(t) \cdot y(t)] = P_{ref} + \overline{S+J+N} - 2\overline{YD}\sqrt{P_{ref}}.$$

In this expression, $G[d^2(t)]$ is the time-averaged value of the auto-correlation term relative to the replica d(t), equalling the average power $P_{ref}$ relative to d(t), during time interval k. $G[y^2(t)]$ is the time-averaged value of the auto-correlation term relative to the output signal y(l) of the combination circuit 4, equalling the output power of circuit 4, hence also denoted by $\overline{S+J+N}$, representing the average value of the S, J and N signal components produced by, respectively, the communication, jamming and noise signals at the output of combination circuit 4 during time interval k. Further, $G[d(t) \cdot y(t)]$ represents the time-averaged value of the cross-correlation term relative to replica d(l) and output signal y(l) during time interval k and may therefore be equalled to $\overline{YD}\sqrt{P_{ref}}$.

In adapting the antenna pattern, it is also possible to use, instead of the above algorithm based on the time average of the least mean square error, the algorithm, based on the maximization of the signal/noise (S/N) ratio and, hence, of the quotient $$f_{msnr} = \frac{(YD)^2 P_{ref}}{S+J+N}$$

of the average peak signal power $(YD)^2 \cdot P_{ref}$ obtained by modulation and the average signal power $(S+J+N)$ from combination circuit 4.

In adapting the antenna pattern, also algorithms of a slightly deviating form can be used, such as the algorithms:

$$f_{mssr} = \frac{\{\overline{YD} \cdot \sqrt{P_{ref}}\}^\alpha}{S+J+N} \text{ and } f_{lmse} =$$

$$P_{ref} + (\overline{S+J+N})^\beta - 2\{\overline{YD} \cdot \sqrt{P_{ref}}\}^\alpha,$$

where the values of $\alpha$ and $\beta$ may deviate slightly from the values 2 and 1, respectively. This provides an adjustment in accordance with an extreme value of a function $f(W_1, W_2)$ obtained through partial summation of the two values $W_1$ and $W_2$ and of a function $f(W_1, W_2)$ containing the quotient of the two values $W_1$ and $W_2$, respectively.

A minimum value of $f_{lmse}$ or a maximum value of $f_{msnr}$ however requires a maximum value of the cross-correlation term $\overline{YD}\sqrt{P_{ref}}$, but this is possible only if the demodulation signal d(l) is optimally aligned with the modulation component in the output signal y(l). The cross-correlation term $\overline{YD}\sqrt{P_{ref}}$ is obtained through means 9 for demodulating signal y(l) from the combination circuit 4 in accordance with replica signal d(l).

In the embodiment in question, showing a good operability under severe jamming conditions, the demodulation is performed in two steps; for this purpose, means 9 comprises a first demodulator 11 and a second demodulator 12. A bandpass filter 13 is inserted between combination circuit 4 and first demodulator 11. With a centre frequency equal to the carrier frequency, filter 13 has a bandwidth approximately equal to twice the bit rate of the spread spectrum code.

The demodulation signal $p_s(t+\phi_1)$ produced by replica signal generator 10 for the first demodulator 11 is generated in a code generator 14 with the aid of associated memory means containing the information about the type of modulation applied with the communication.

As to the phase angles $\phi_1$ and $\phi_2$, it should be noted that with a communication over a distance of several kilometers and with a synchronous generation of the spread spectrum code in the MHz-field by both the transmitting and the receiving units, the spread spectrum signal $p_s(t+\phi_1)$ of code generator 14, when supplied to the first demodulator 11, leads the corresponding signal component y(t) in the output signal of the combination circuit 4 by several bits. Code generator 14 would therefore have to slow down for a short period, or the generation of the signals would have to be delayed over a certain phase $\phi_1$ and $\phi_2$, respectively, to achieve a synchronisation and a phase alignment between the spread spectrum code $p_s(t+\phi_1)$ of code generator 14 and the corresponding signal component in the output signal y(t) of bandpass filter 13. The timing of code generator 14 containing memory means still forms an uncertain factor in the demodulation process. For this reason, the replica signal generator 10 comprises a first control circuit 15, of which a feasible embodiment will be described hereinafter.

Through a second bandpass filter 16 the output signal $y(t)*p_s(t+\phi_1)$ of the first demodulator 11 is supplied to the second demodulator 12. With a centre frequency equal to the carrier frequency, second bandpass filter 16 has a bandwidth of twice the value of the information bit rate.

The second bandpass filter 16 is followed by the second demodulator 12 for further demodulation of the output signal of filter 16 with the aid of a frequency generator 17 tuned to the carrier frequency $\omega$; frequency generator 17 forms part of the replica signal generator 10.

Also the signal $\sin(\omega t + \phi_2)$ supplied by the frequency generator 17 should be phase-synchronised with the corresponding component in the signal obtained from the second bandpass filter 16. To this effect the replica signal generator 10 contains a second control circuit 18, which will be described in more detail herinafter.

In this embodiment an amplitude detector 20 is connected to the second demodulator 12 via a lowpass filter 19 having a limit frequency equal to the maximum frequency of the information band; the amplitude detector 20 produces a pure biphase signal from the supplied signal in so far as the latter signal is in any way distorted. Using a decoder 21 connected to amplitude detector 20, the information signal is converted into a form suitable for observation or recording.

Figure 2:
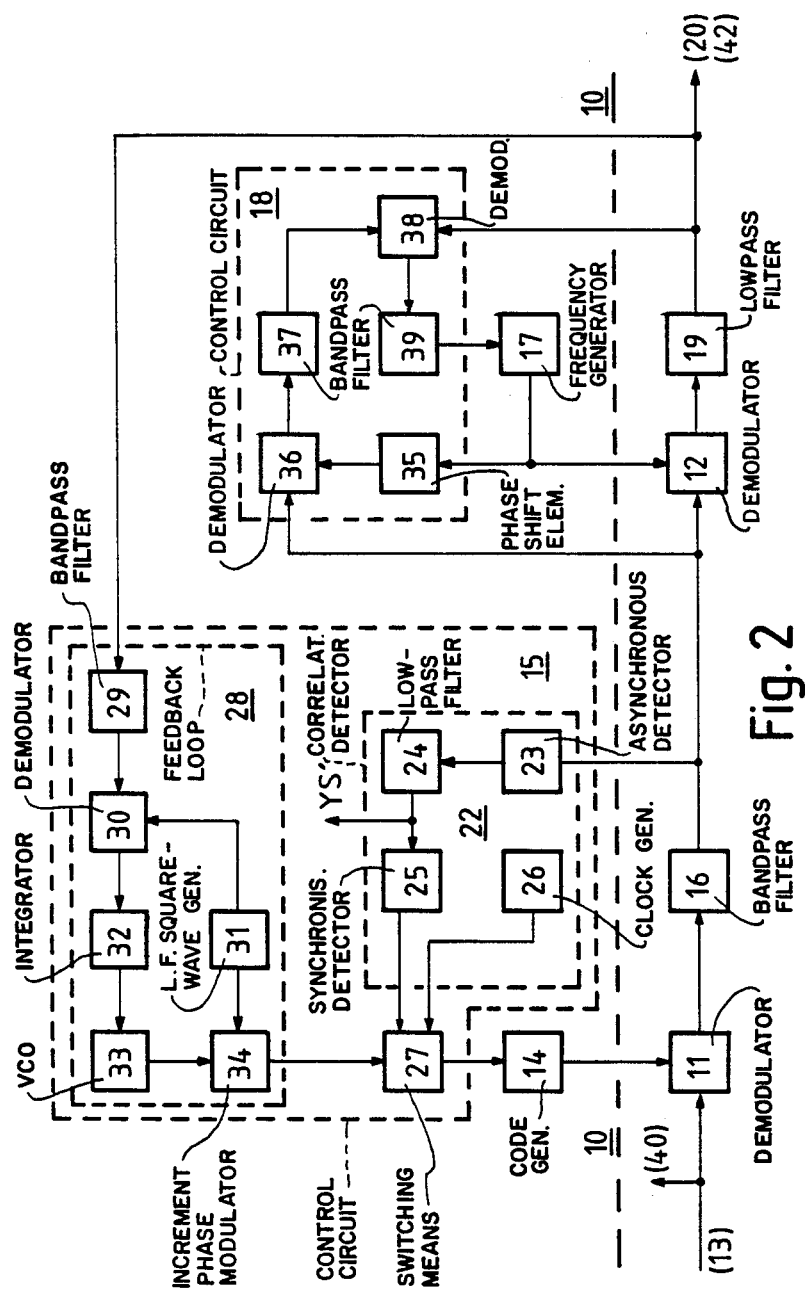
FIG. 2 illustrates a detailed embodiment of a part of the receiving unit depicted in FIG. 1.

FIG. 2 shows a feasible embodiment of the first control circuit 15 in detail. As to the phase synchronisation of the spread spectrum signal $p_s(t+\phi_1)$ with the corresponding component in the output signal of the bandpass filter 13, there are two essential steps.

The first step concerns the time delay of code generator 14, such that a synchronous condition is obtained between the output signal $p_s(t+\phi_1)$ of generator 14 and the corresponding component of the signal supplied by the first bandpass filter 13. The next step concerns the phase alignment of the output signal $p_s(t+\phi_1)$ of code generator 14 and the above component in the signal from bandpass filter 13. Through taking these two steps it is achieved that the data signals spread over the entire spectrum range are transformed into a narrow frequency range about the carrier frequency, while the jamming signals usually active in a narrow frequency range about the carrier frequency are spread through transformation over the entire spread spectrum range and subsequently filtered away to a significant extent by means of the narrow bandpass filter 16.

To carry out the first step, the first control circuit 15 comprises a correlation detector 22 connected to the bond pass filter 16 for generating a synchronisation signal for code generator 14, containing the memory means, at the instant a synchronisation between the signals concerned is detected. Other means should then be used to obtain a more precise phase alignment between the signals concerned. The correlation detector 22 thereto comprises a continuous circuit of an asynchronous detector 23, a low-pass filter or integrator 24, and a synchyronisation detector 25. Correlation detector 22 also contains a clock generator 26, initiated simultaneously with the clock generator of the communication transmitting unit and supplying its timing signals to code generator 14 via switching means 27. It is necessary that the frequency of clock generator 26 be set to a slightly lower value, as compared with that for the communication transmitting unit, or have the clock generator 26 periodically perform a small negative frequency jump of short duration, while the frequency is otherwise kept the same. The result of the two methods is that the time lead of the spread spectrum signal with respect to the corresponding component in the output signal of the first bandpass filter 13 is eliminated slowly but surely.

The asynchronous detector 23, which may function as a feedback loop or envelope detector (e.g. a rectifying circuit), produces an output signal which, after filtering by the lowpass filter or the integration in the integrator 24, is a function of the signal level of the supplied input signal representing the correlation function. This signal level is dependent on the extent to which the correlation between the codes in the two supplied signals has been effected. Reaching a predetermined level of the output signal of the lowpass filter or integrator 24 therefore implies that a synchronisation between the two codes has given a satisfactory result. The attainment of this signal level with the correlation between the codes is established by the synchronisation detector 25, which subsequently sets the switching means 27 to the second position.

The setting of switching means 27 to the second positipn implements the other step, concerning the phase alignment of the output signal of code generator 14 with the corresponding component in the output signal of the bandpass filter 13. To this effect, the first control circuit 15 comprises a feedback loop 28 supplied with the output signal of the lowpass filter 19 modulated on the carrier. Feedback loop 28 produces a timing signal, fed to code generator 14 via switching means 27. In a feasible embodiment, feedback loop 28 comprises a bandpass filter 29 and connected thereto, a demodulator 30; the demodulator 30 is also fed with the output signal of a fixed l.f. square wave generator 31. The signal supplied by demodulator 30 is fed to an integrator 32 to produce a d.c. signal having the function of control signal for a voltage-controlled oscillator 33 (VCO). The output signal of VCO 33 and that of the l.f. square-wave generator 31 are jointly supplied to an increment phase modulator 34, suitable to shift the phase of the other signal to be supplied, viz. the VCO signal, alternately forward and backward over a small value in the rhythm of the square wave generated. In consequence of this, there will be a change in the extent of correlation between the output signal of code generator 14 and the corresponding component in the output signal obtained from the first bandpass filter 13, causing a shift in the amplitude of the input signal of the second demodulator 12. Through the forward and backward shifting of the clock phase the signal is amplitude modulated in accordance with the phase shifting rhythm particularly with a non-ideal phase alignment, causing a change in the d.c. voltage for VCO 33. Only in case of a certain setting of the integrator, the VCO 33 will generate a signal with such a code frequency that modulation thereon with the square wave does not result in an amplitude-modulated signal for filter 29. In such a case, VCO 33 remains at the set value. Also other embodiments of a second control circuit are known, such as from R. C. Dixon, "Spread-Spectrum Systems", Wiley Interscience, New York, etc. 1976, pp. 210-212.

Furthermore, corect working of such a communication receiving unit requires a third step for the purpose of the inphase alignment of the frequency of generator 17 with the carrier frequency in the output signal of the bandpass filter 16. This is realised by the second control circuit 18, of which an embodiment of a socalled I.Q. phase-locked loop or "Costas loop" is known from the citedbook of R. C. Dixon, pp. 155-158. Frequency generator 17, functioning as a voltage controlled oscillator (VCO), supplies the demodulation signal to second demodulator 12 and, using a phase shifting element 35 with $\Delta\phi = 90°$, a quadrature demodulation signal to a third demodulator 36. The second and the third demodulators also receive the filtered output signal of the first demodulator 11 to generate, in response, output signals to be supplied to a fourth demodulator 38 after filtering in the bandpass filters 19 and 37. After filtering in a narrow-bandpass filter 39 with the centre frequency equalling the carrier frequency, the output signal of demodulator 38 is suitable to function as control signal for VCO 17.

Embodiments of a spread spectrum communication system are known, where the communication transmitting unit uses a single timing unit to control both the carrier frequency generator and the code generator, and where there is a simple relationship between the carrier frequency and the spread spectrum frequency. Hence, there is constantly a coherent relationship between the carrier frequency and the spread spectrum frequency. Such an embodiment of a communication receiving unit is, for example, described in the cited book of R. C. Dixon, pp. 212-214, where a timing unit controls both the carrier frequency generator and the code generator. The signal supplied by combination unit 4 and then filtered is first demodulated with the carrier and then correlated with the spread spectrum signal; the resulting signal is subsequently examined for phase deviation in a phase detector. After filtering in an l.f. bandpass filter, the signal produced by the phase detector is suitable as control signal for the above timing unit designed as voltage-controlled oscillator.

The term $\overline{S+J+N} = G[y^2(t)]$ required for the adaptation of the antenna pattern refers to the power, as present at the output of combination circuit 4. This power can be determined by squaring and subsequent averaging, i.e. l.f. filtering of the output signal of combination circuit 4. As illustrated in FIG. 1, the detector 5 thereto comprises first means connected to the first bandpass filter 13, for example a squaring circuit 40 and, connected thereto, a lowpass filter 41 supplying, conditional upon the applied filter characteristic, a value $W_1$ for adjusting means 8, where $W_1$ is proportional to the time average of the power of the signal produced by combination circuit 4 and related to at least a portion of the transmitter frequency band. In this connection it is conceivable to limit the measurement in its totality to a certain number of frequency components. The cross-correlation term $\overline{YD\sqrt{P_{ref}}}$ represents the time average of the cross-correlatin product between the r.f. signal y(t) supplied by combination circuit 4 and the singal supplied in a split form as r.f. demodulation signal to first and second demodulators 11 and 12. The information component is here however considered of being constant in amplitude, as provided for in this case, namely by measuring the value of $\overline{YD\sqrt{P_{ref}}}$ only during the time intervals devoid of information, the socalled synchronisation blocks. During the synchronisation blocks, inserted periodically during the communication, the information component $P_i(t)$ is constant, for example 1. It is therefore preferable to adapt the antenna pattern continuously during the synchronisation blocks, were it not that in general the communication occurs under severe jamming conditions and with an unfavourable setting of the communication receiving unit, viz. the condition when both the code generator 14 and the carrier frequency generator 17 are out of phase alignment. Under such unfavourable conditions the cros-correlation term hardly changes in value by varying the antenna pattern. This is the reason that in the first instance only the code generator 14 is aligned, while for the adaptation of the antenna pattern not the cross-correlation term $\overline{YD\sqrt{P_{ref}}}$, but $\overline{YD'\sqrt{P_{ref}}}$ is used, where D' refers to the signal produced by code generator 14. Here the fact that the cross-correlation term $\overline{YD'\sqrt{P_{ref}}}$ still contains an undesired r.F. component is disregarded. This disadvantage is however obviated by selecting the time average of the l.f. component of the signal voltage associated with this correlation term; this is achieved by using an asynchronous detector (such as a phase-locked loop, an envelope detector, etc.) connected to second bandpass filter 16 and a subsequent lowpass filter. Using a correlation detector 22, as illustrated in FIG. 2, the signal value $\overline{YD'\sqrt{P_{ref}}}$ is obtainable as output voltage of the lowpass filter 24. Using this output signal, the adjusting signals are determined in the adjusting means 8, as part of the initial adaption of the atenna pattern. In consequence of this adaption, the cross-correlation term will increase progressively during the alignment of code generator 14. Assuming that meanwhile the alignment of the frequencyu generator 17 is well under way, it may be supposed that when a certain threshold value has been reached by the cross correlation term, a usable value of the cross correlation term $\overline{YD\sqrt{P_{ref}}}$ is already available to adapt the antenna pattern by using the term $\overline{YD\sqrt{P_{ref}}}$ instead of $\overline{YD'\sqrt{P_{ref}}}$ for the processing unit. The voltage measurement of $\overline{YD\sqrt{P_{ref}}}$ should however be taken during the periodical synchronisation blocks. Each of these blocks are introduced by a very specific code series, On recognising this code series, the decoder 21 produces a control signal for a preset time, when the then supplied invormation signal $P_i(t)$ assumes a constant value, for example "1". This control signal opens a gate swithc 42, which receives the information signal of the lowpass filter 19. During this preset time the gate switch 42 passes the $\overline{YD\sqrt{P_{ref}}}$ signal for an amplitude measuring circuit 43 with a narrow-band l.f. filter process, resulting in the measuring value $W_2$ for adjusting means 8. The ensemble average $E[\epsilon^2(l)]$ to be examined by adjusting means 8 is a quadratic semi-definite positive function, which may be represented by a concave hyperbolic paraboloidal surface. The adaptation of the weighting factors therefore implies the descent along the surface to reach the lowest point of the function. To this effect, the gradient methods are generally applied; a usable method is known from the article of R. Fletcher and C. M. Reeves, "Function minimization by conjugate gradients", Electronic Computing Laboratory, The University, Leeds 2; Computer Journal, Vol. 7, 1964, pp. 149–153. In this method an iterative process is performed a long the conjugate search direction $Z_{k+1}$ to search for the minimum value of $E[\epsilon^2(l)]$. The search direction is determined using the formula $$Z_{k+1} = -\text{grad}\{E[\epsilon^2(l)]\}_{k+1} + \beta_k \cdot Z_k, \text{ where}$$

$$\beta_k = \frac{\text{grad}^T\{E[\epsilon^2(l)]\}_{k+1} \cdot \text{grad}\{E[\epsilon^2(l)]\}_{k+1}}{\text{grad}^T\{E[\epsilon^2(l)]\}_k \cdot \text{grad}\{E[\epsilon^2(l)]\}_k},$$

and $\beta_0 = 0$ for the first search direction. According to this iterative process, the system converges rapidly to the unambiguous minimum of $E[\epsilon^2(l)]$.

We claim:

1. An adaptive communication receiving unit suitable for the suppression of noise and jamming signals, said receiving unit comprising:
   a plurality of antenna elements;
   a network of adaptive weighting filters connected to said antenna elements;
   a combination circuit cnnected to said network;
   a detector connected to the combination circuit and provided with means for generating a replica (d) of an information-supplying carrier signal present in a signal received by the antenna elements and with means for demodulating a signal (y) of the combination circuit to the information-related frequency band on the basis of the replica (d); and
   adjusting means for generating adjustment signals for the adaptive weighting filters, characterised in that the detector comprises first means for determining, for the adjusting means, a value ($W_1$) proportional to a time average of the power concerning the signal (y) produced by the combination circuit and relating to at least a portion of a predefined transmitter frequency band; that the detector comprises second means for determining, for the adjusting means, a value ($W_2$) proportional to a time average of the cross correlation concerning the signal (y) and the replica (d) and relating to at least a portion of the predefined transmitter frequency band; and that the adjusting means is designed for generating, upon the supply of adjusting signals to the weighting filters, modified adjusting signals on the basis of the time-averaged values ($W_1$ and $W_2$) resulting therefrom to adjust the weighting filters corresponding with an extreme value of a function $f(W_1, W_2)$ containing the two values $W_1$ and $W_2$.

2. A communication receiving unit as claimed in claim 1, whereby said means for generating a replica (d) of the carrier of the information-supplying signal received by the receiving unit is provided with memory means for storing the information for a spread-spectrum modulation applied with the generation of the carrier of the signal received by the receiving unit, and with a code generator controlled by said memory means, and whereby said meand for demodulating is provided with a first demodulator for demodulating the signal (y) from the combination circuit by the code generator, and with a second demodulator connected to the first demodulator for demodulating the output signal from the first demolulator in synchronism with the carrier frequency, characterised in that the detector comprises means, connected to a first demodulator, for determining the time average ($W_3$) of an available cross-correlation signal as a substitute value of the time average ($W_2$).

3. A communication receiving unit as claimed in claim 2, characterised in that the means for determining the time average ($W_3$) as a substitute value of the time average ($W_2$) comprises an asynchronous detector and a lowpass filter connected thereto.

4. A communication receiving unit as claimed in claim 1, characterised in that the detector comprises a unti, connected to the second demodulator, for establishing a periodically recurring, fixed information signal in a supplied output signal, and further comprises a gate circuit controlled by said unit connected to the second demodulator in the presence of said information signal, and a amplitude measuring circuit, connected thereto, for obtaining said time average ($W_2$).

5. A communication receiving unit as claimed in claim 1, characterised in that the means for determining a time average ($W_1$) of the power of signal (y) comprise a signal squaring circuit and a low frequency filter connected thereto.

6. A communication receiving unit as claimed in claim 1, characterised in that the adjusting means is suitable for generating adjusting signals to achieve a setting of the weighting filter elements, corresponding with an extreme value of a function $f(W_1, W_2)$ obtained by partial summation of the two values $W_1$ and $W_2$.

7. A communication receiving unit as claimed in claim 1, characterised in that the adjusting means is suitable for generating adjusting signals to achieve a setting of the weighting filter elements, corresponding with an extreme value of a function $f(W_1, W_2)$ containing the quotient of the two values $W_1$ and $W_2$.

* * * * *